Aug. 29, 1961 E. L. HOPKINS 2,997,914
APPARATUS FOR TESTING THE ALIGNMENT OF VEHICLE HEADLAMPS
Filed Feb. 2, 1959 12 Sheets-Sheet 3

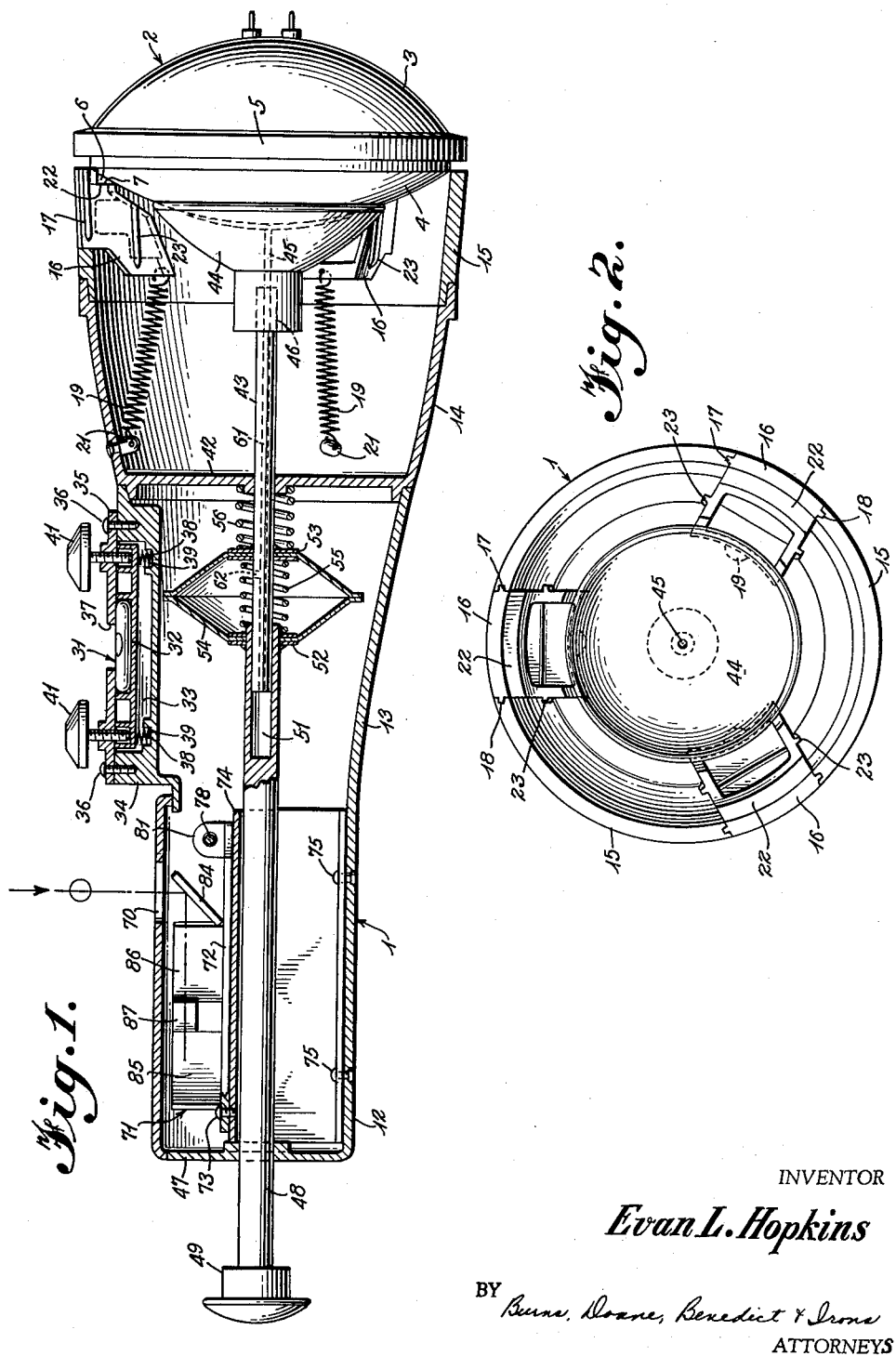

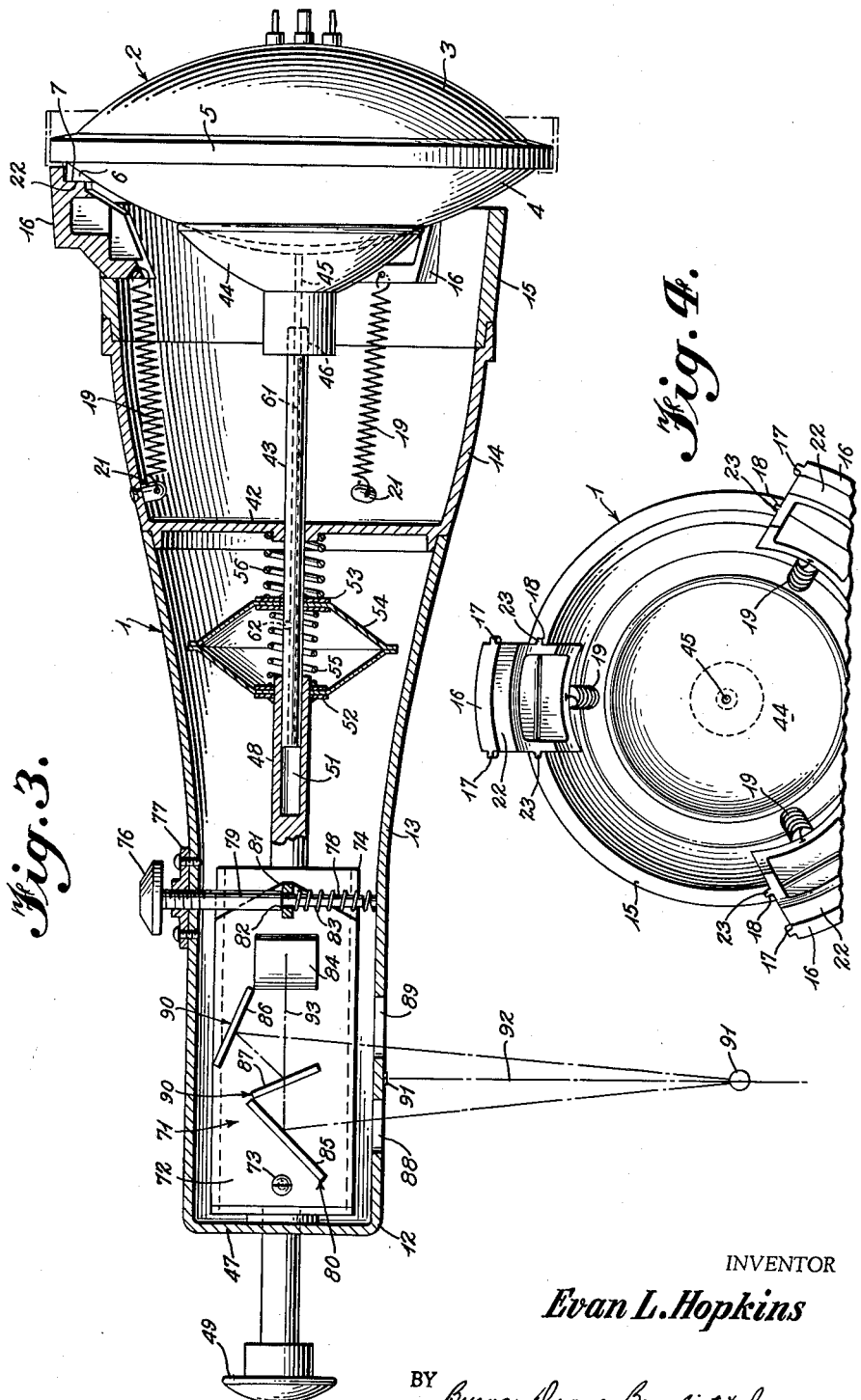

INVENTOR
*Evan L. Hopkins*

BY Burns, Doane, Benedict & Irons
ATTORNEYS

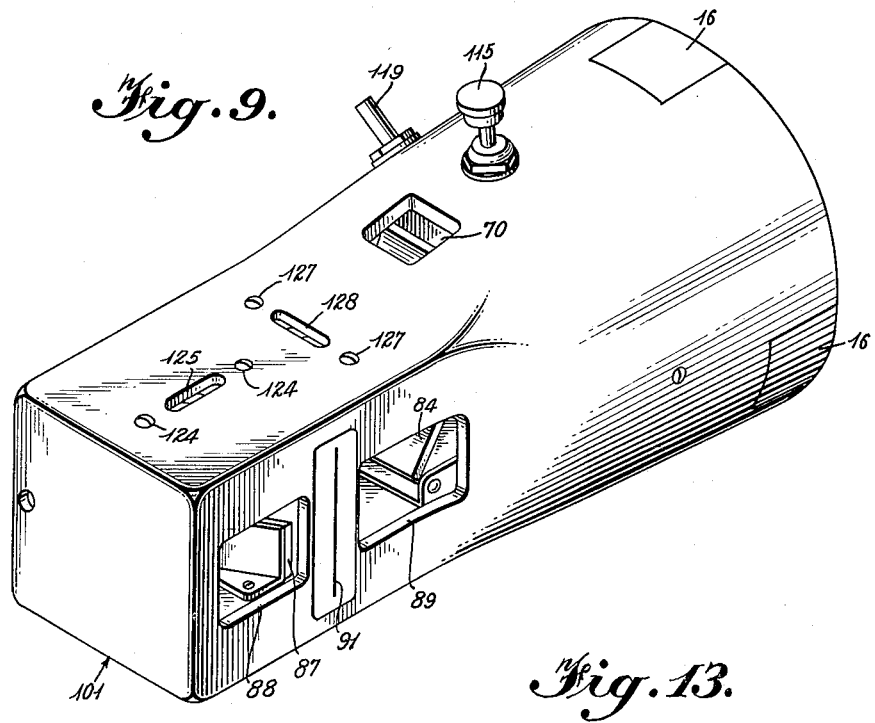
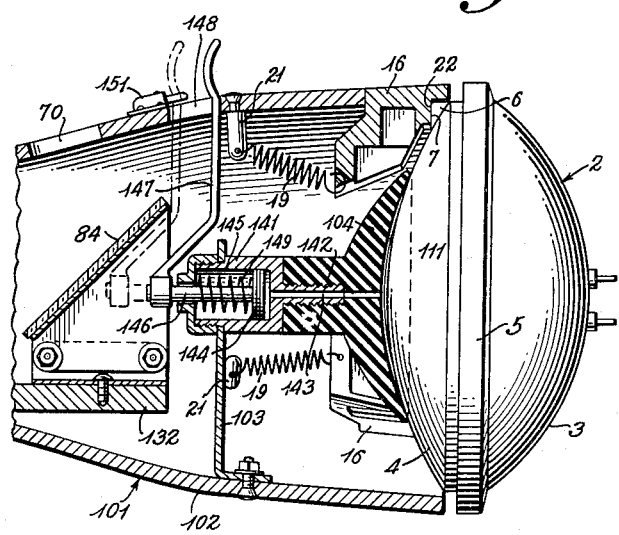

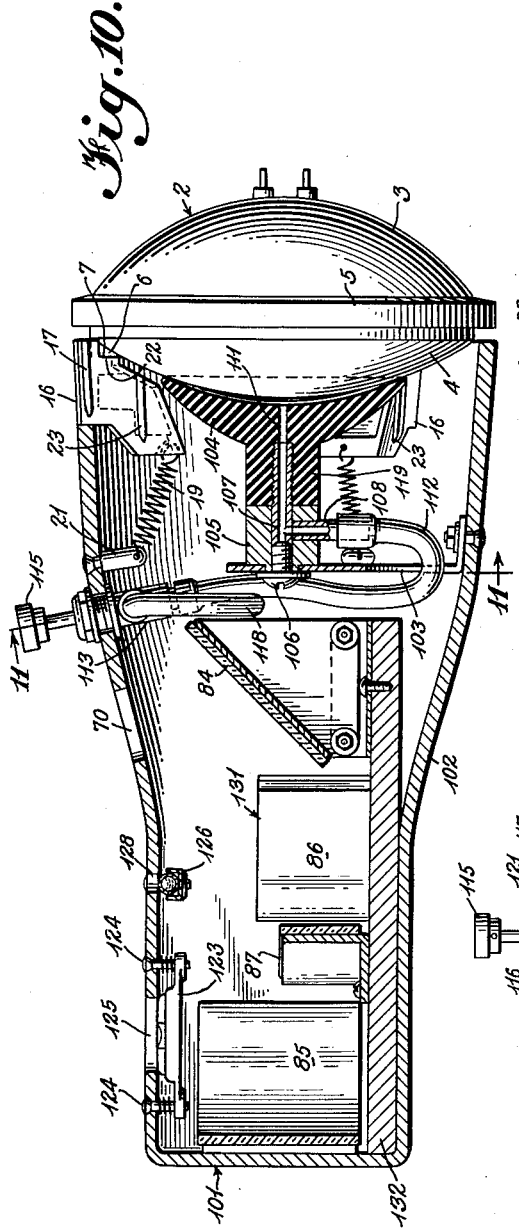

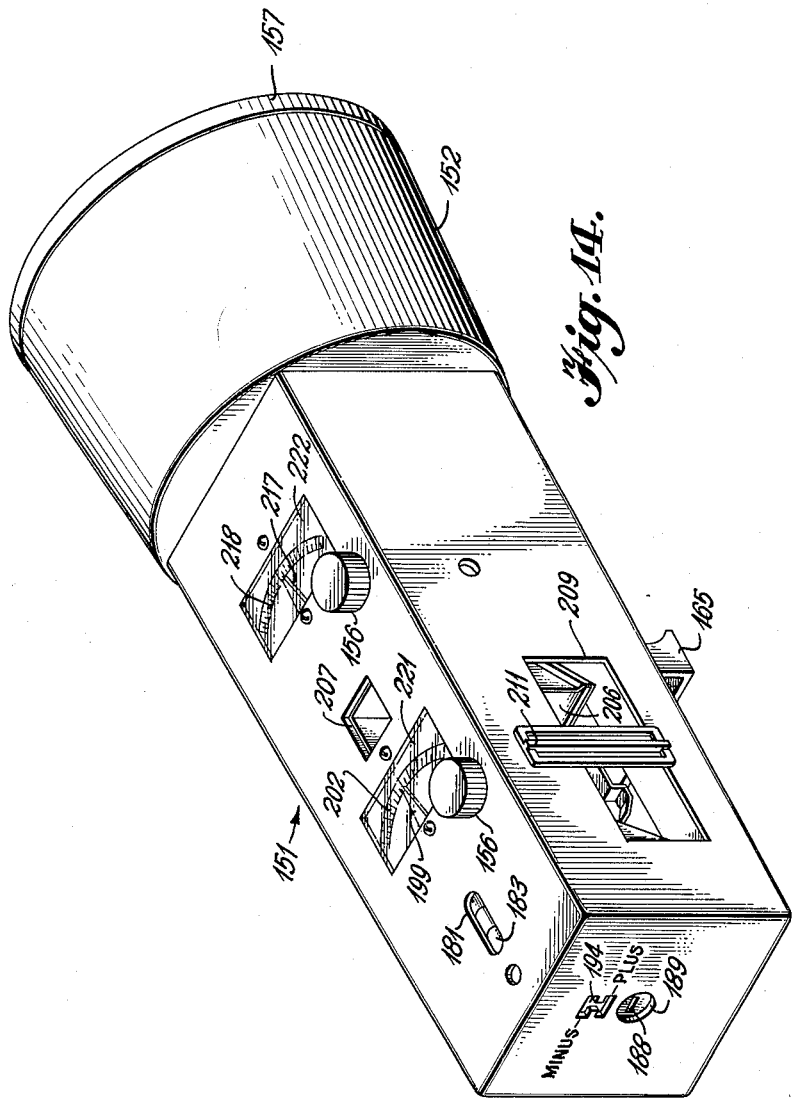

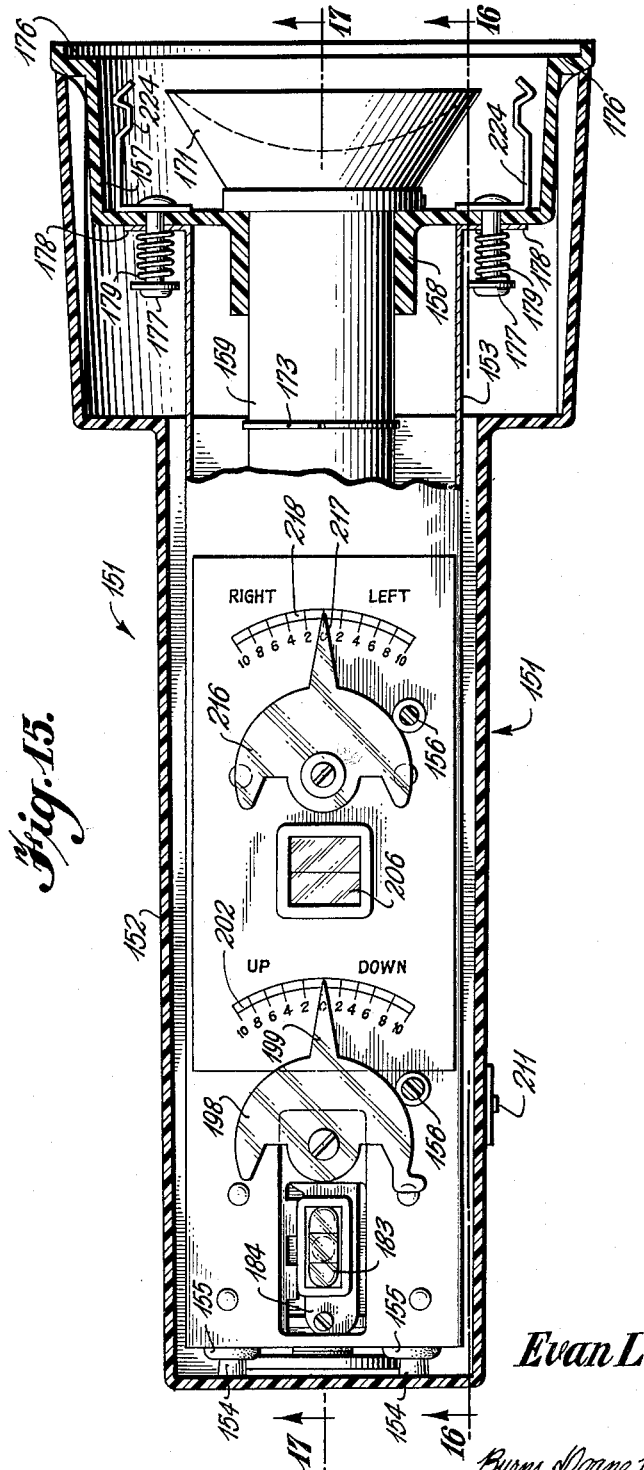

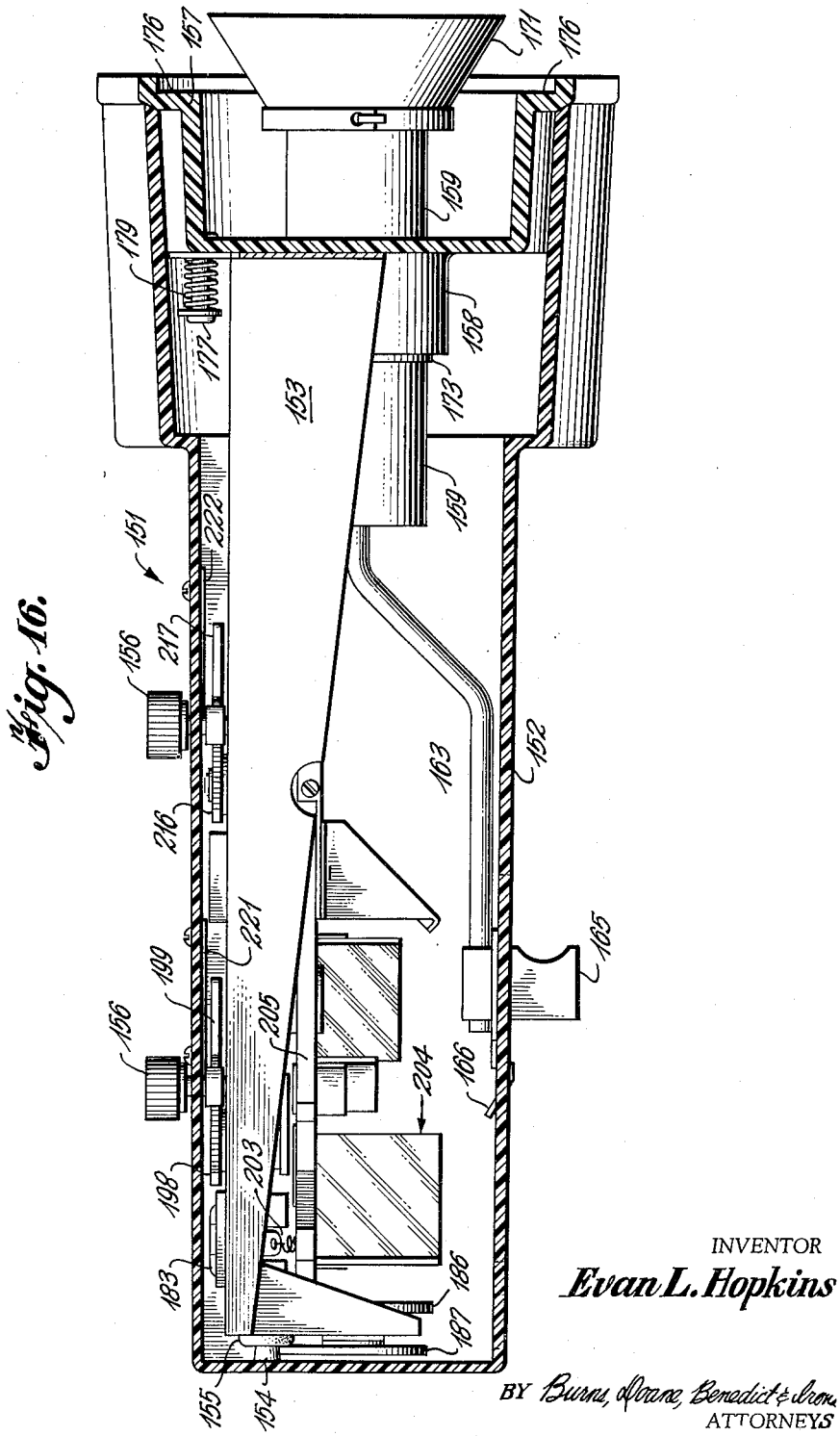

Aug. 29, 1961  E. L. HOPKINS  2,997,914
APPARATUS FOR TESTING THE ALIGNMENT OF VEHICLE HEADLAMPS
Filed Feb. 2, 1959  12 Sheets-Sheet 9

INVENTOR
Evan L. Hopkins
BY
ATTORNEYS

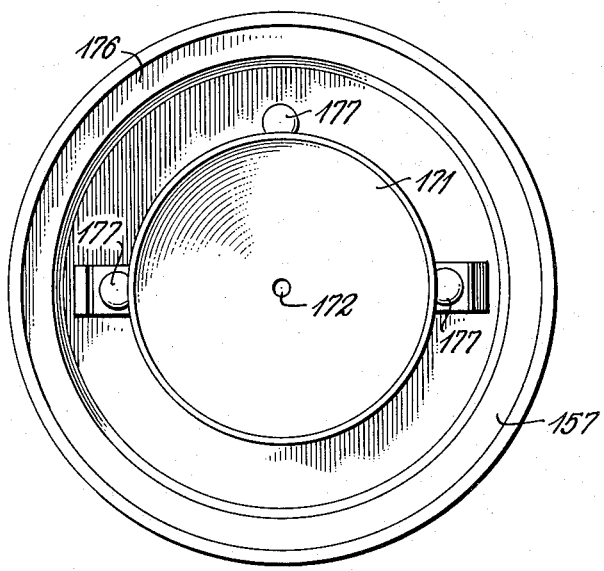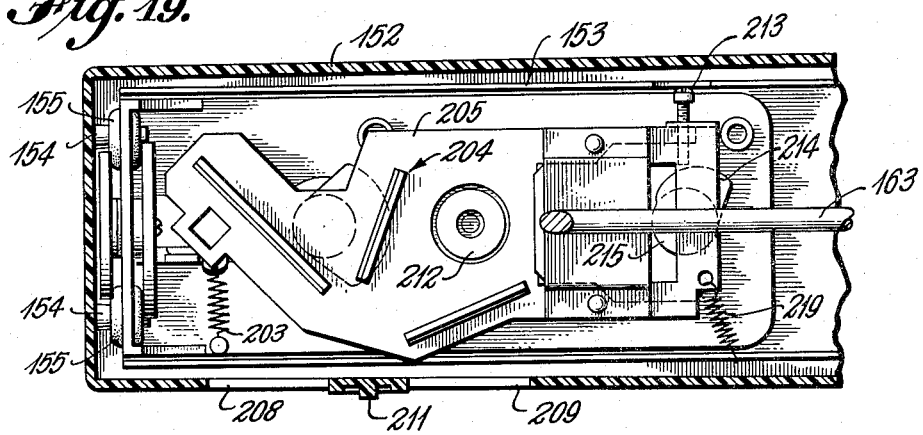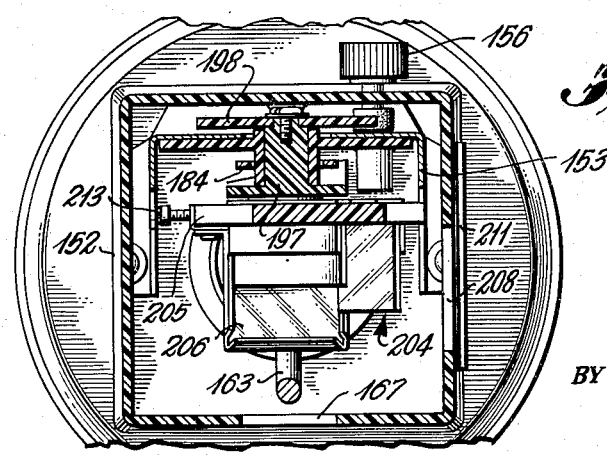

Aug. 29, 1961   E. L. HOPKINS   2,997,914
APPARATUS FOR TESTING THE ALIGNMENT OF VEHICLE HEADLAMPS
Filed Feb. 2, 1959   12 Sheets-Sheet 11
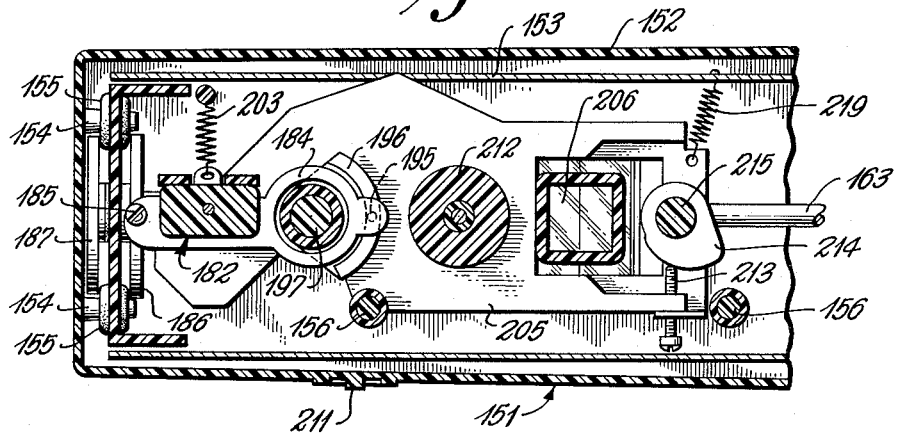
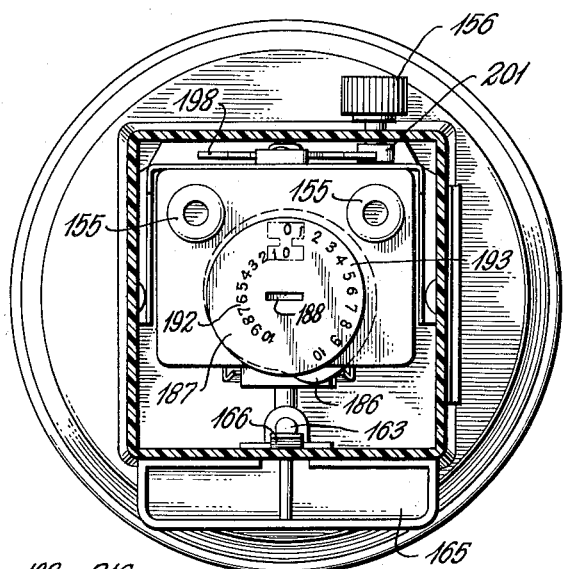
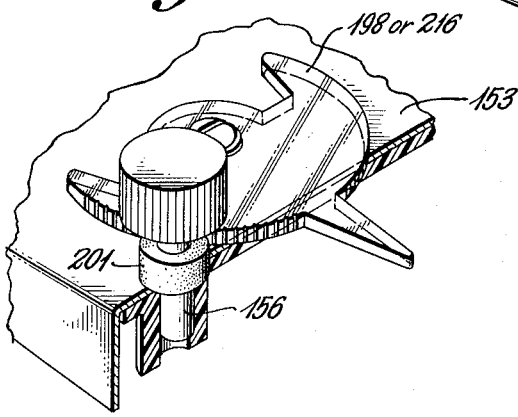
INVENTOR
*Evan L. Hopkins*
BY *Burns, Doane, Benedict & Irons*
ATTORNEYS Aug. 29, 1961 E. L. HOPKINS 2,997,914
APPARATUS FOR TESTING THE ALIGNMENT OF VEHICLE HEADLAMPS
Filed Feb. 2, 1959 12 Sheets-Sheet 12

INVENTOR
*Evan L. Hopkins*

BY *Burns, Doane, Benedict & Irons*
ATTORNEYS

United States Patent Office 2,997,914
Patented Aug. 29, 1961

1

2,997,914
APPARATUS FOR TESTING THE ALIGNMENT OF VEHICLE HEADLAMPS
Evan L. Hopkins, Emporia, Kans., assignor to Hopkins Manufacturing Corporation, Emporia, Kans., a corporation of Kansas
Filed Feb. 2, 1959, Ser. No. 790,772
16 Claims. (Cl. 88—14)

This invention relates to apparatus for testing the alignment of vehicle headlamps and, more particularly, the alignment of sealed beam vehicle headlamps having universally adjustable mountings.

Modern vehicle headlamps are designed to direct beams of bright light a substantial distance in front of the vehicle. Such beams must be carefully aimed to provide a maximum degree of night visibility to the driver of the vehicle and a minimum of blinding glare to the occupants of on-coming vehicles. In recent years, a number of devices have been developed to test the alignment of headlamps with respect to the longitudinal axis of the vehicle to determine whether the beams are properly aimed. None of the test devices heretofore developed have completely satisfied requirements for great accuracy coupled with the speed essential to mass-production operation in vehicle assembly plants and inspection stations.

To overcome the disadvantages of prior art devices, it is an object of this invention to provide an apparatus embodying an improved system of mirrors which facilitates an accurate determination of the horizontal alignment of vehicle headlamps.

It is another object of this invention to provide such apparatus which is characterized by an improved suction device for mounting and firmly seating the apparatus on vehicle headlamps.

It is an additional object of this invention to provide a pair of improved devices each characterized by a system of mirrors and a target for testing the alignment of both of a pair of vehicle headlamps by a single setup of the pair of devices.

Broadly described, the invention comprises an apparatus for testing the alignment of vehicle headlamps having outwardly facing reference surfaces for positioning the testing apparatus. Such apparatus includes a frame provided with a seating surface corresponding to the reference surface of its associated headlamp, means carried by the frame for releasably retaining the frame on the headlamp with the seating surface firmly seated on the reference surface, means adapted for attachment to the other headlamp providing a target positioned a predetermined distance outwardly from the other headlamp and a multiple mirror optical system carried by the frame to determine whether the longitudinal axis of the headlamp is properly aligned horizontally with respect to the longitudinal axis of the vehicle. The multiple mirror optical system is divided into a pair of mirror components each having an objective reflecting portion exposed to the target when the apparatus is attached to the headlamps. One of the mirror components is provided with an even number of reflecting surfaces to reflect a normal image of the target and the other of the mirror components is provided with an odd number of at least one reflecting surface to reflect a reversed image of the target. The two mirror components are so positioned relative to a pair of imaginary datum planes which intersect at a predetermined angle that the emergent reflection paths of the reversed and normal images of the target both lie in one of the datum planes only when the other datum plane intersects the target. When the other datum plane does not intersect the target, the emergent, reflection paths of the reversed and normal images of the target lie on opposite sides of the first datum plane.

A preferred and novel means for holding the frame attached to the headlamp comprises broadly a vacuum cup positioned to engage the headlamp in holding relationship, an expansible chamber device mounted between said vacuum cup and said frame to releasably urge said frame toward said headlmp thereby bringing said seating and reference surfaces into pressure engagement, and fluid conducting means connecting said expansible chamber device and said vacuum cup to apply suction to said vacuum cup while said expansible chamber device is urging said frame toward said headlamp.

The invention having been generally set forth, preferred specific embodiments thereof which accomplish one or more of the stated objects and others will now be described in detail with reference to the drawings in which:

FIGURE 1 is a vertical sectional view of one embodiment of a headlamp aiming device according to the invention;

FIGURE 2 is an end view of the device of FIGURE 1 showing the adapters which are provided with seating surfaces to contact corresponding reference surfaces on the headlamp with the adapters in retracted positions;

FIGURE 3 is a horizontal sectional view of the device of FIGURE 1;

FIGURE 4 is an end view of the device of FIGURE 1 showing adapters in extended positions to permit mounting of the device on a larger sized headlamp;

FIGURE 9 is a perspective view of a modified headlamp aiming tool according to the invention;

FIGURE 10 is a vertical sectional view of the device shown in FIGURE 9;

FIGURE 11 is a vertical sectional view taken in the direction of the arrows along the line 11—11 of FIGURE 10;

FIGURE 12 is a fragmentary vertical sectional view showing the adapters extended with the seating surfaces contacting the corresponding reference surfaces of a large size headlamp;

FIGURE 13 is a fragmentary vertical sectional view showing the manually operated vacuum pump which may be mounted on the aiming tool frame to provide sufficient suction to maintain the tool firmly seated on the headlamp;

FIGURE 14 is a perspective view of a further and preferred embodiment of the invention;

FIGURE 15 is a horizontal sectional view of the device shown in FIGURE 14;

FIGURE 16 is a vertical sectional view taken along the line 16—16 of FIGURE 15;

FIGURE 18 is a view of the vacuum cup end of the device shown in FIGURE 14;

FIGURE 19 is a fragmentary horizontal sectional view taken along the line 19—19 of FIGURE 17 and showing the bottom of the mirror system;

FIGURE 20 is a fragmentary horizontal sectional view taken along the line 20—20 of FIGURE 17 and showing the top of the mirror supporting table with its adjusting means and other details;

FIGURE 21 is a transverse vertical section taken along the line 21—21 of FIGURE 17 and showing the initial setting means for the spirit level mechanism;

FIGURE 22 is another transverse vertical section taken along the line 22—22 of FIGURE 17 and showing the spirit level adjusting means;

FIGURE 23 is a fragmentary perspective view showing one of the indicator adjusting means;

Figure 5:
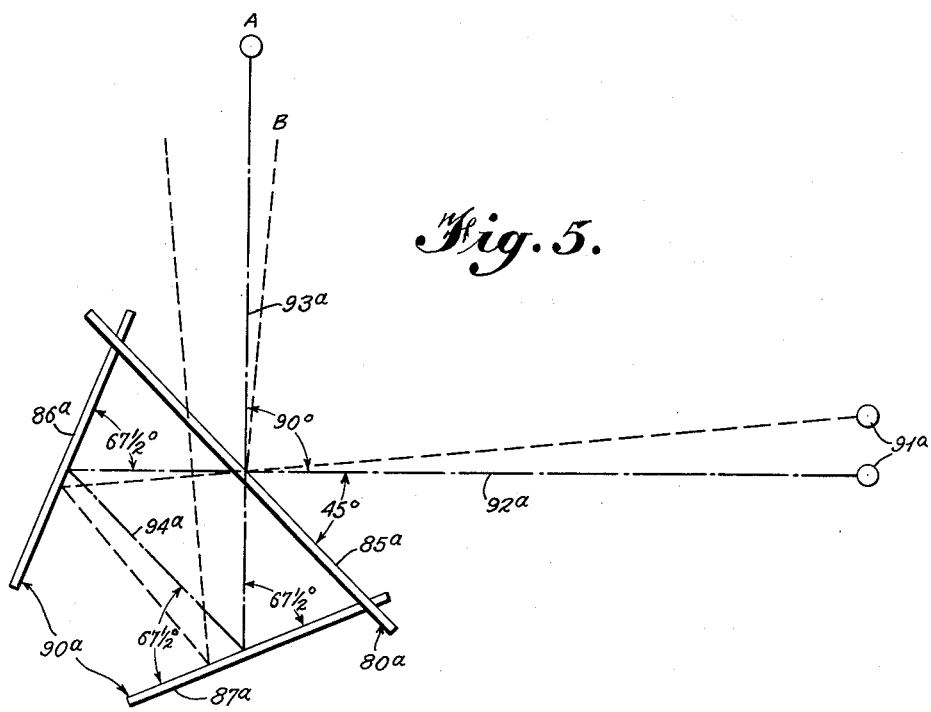
FIGURE 5 is a schematic diagram showing a slightly modified form of mirror system and illustrating the function of the mirror system in testing the alignment of the headlamp.

With reference to the device illustrated in FIGURES 1 through 4, a headlamp aiming tool designated generally by the reference numeral 1 is mounted on a conventional sealed beam headlamp 2 which is provided with a cup-shaped base 3, a lens 4, and a lens retaining ring 5. The lens 4 is provided with a plurality of aiming pads 6 which usually are three in number, integral with the lens and circumferentially spaced at 60° intervals. Each aiming pad 6 is provided with a smooth reference surface 7 on which the headlamp aiming tool 1 may be seated.

The headlamp aiming tool 1 includes a frame 12 which includes three telescoped sections 13, 14 and 15 which are connected together as by welding. At the inner end of the tool 1, three mounting adapters 16 are slideably mounted by longitudinal tongues 17 in grooves 18 in the frame 12. The adapters 16 are releasably retained in the frame 12 by springs 19 extending between the adapters 16 and studs 21 on frame 12. The adapters 16 are provided with smooth seating surfaces 22 which correspond to the headlamp reference surfaces 7. The adapters 16 are angularly spaced the same as the reference surfaces 7. Thus, the tool 1 may be mounted on the headlamp 2 with the adapter surfaces 22 engaging the reference surfaces 7 and with the longitudinal axis of the tool 1 coincident with the longitudinal axis of the headlamp 2. As illustrated in FIGURES 4 and 12, the adapters 16 may be pulled axially away from the frame 12 to remove the tongues 17 from the grooves 18. The adapters may then be mounted at radially extended positions on the frame 12 with a second set of tongues 23, which are radially spaced from the tongues 17, matingly engaging the grooves 18. With the adapters in their radially extended positions, the tool 1 may be mounted upon a larger sized headlamp. It will be understood that the adapters could be provided with additional radially space tongues to permit use with headlamps of many different sizes.

For determining the vertical angular alignment of the headlamp with respect to the longitudinal axis of the vehicle, the tool 1 is provided with a spirit level assembly 31 which includes a floating frame 32 positioned in a cavity 33 of a housing 34 which is rigidly mounted by any suitable means, such as screws, not shown, on the upper wall of the frame 12. The cavity 33 is closed by a cap 35 fixed to the housing 34 by screws 36. The level bubble carried by the floating frame 32 is exposed through a window 37 in the cap 35. The floating frame 32 is adjustably retained between a pair of coil springs 38 positioned in sockets 39 in housing 34 and a pair of adjusting screws 41 which are threadedly mounted in cap 35. The cap 35 and adjusting screws 41 are provided with a coacting indicator and scale, not shown, in order that the adjustment of screws 41 may be accurately measured.

Slideably mounted in an axial opening in cross member 42 of frame 12 is an axially extending hollow tube 43 which carries at the headlamp end thereof a vacuum cup 44 having a longitudinal conduit 45 extending from the hollow face of the vacuum cup to a cavity 46 which receives the end of tube 43. Slideably mounted in the end wall 47 of frame 12 is an axially extending actuating rod 48 having on its outer end a handle 49 and on its inner end a cavity 51 which telescopingly receives one end of tube 43. Mounted between brackets 52 and 53 and rigidly secured by fluid-tight connections to rod 48 and tube 43, respectively, is a flexible bellows 54 which is preferably constructed of sheet metal. Mounted between the brackets 52 and 53 to normally expand the bellows 54 is a coil spring 55. Mounted between the bracket 53 and the cross member 42 is a second coil spring 56. The tube 43 contains a longitudinal bore 61 and a lateral bore 62 which connects the interior of the bellows 54 with the conduit 45 and the hollow face of the vacuum cup 44.

A multiple mirror system designated generally by the reference numeral 71 is rigidly mounted on a flat carrier 72 which is in turn pivotally connected by a pin 73 to a normally horizontal table 74 which is rigidly fixed to the frame 12 by screws 75. The mirror carrier 72 may be laterally adjusted by adjusting screw 76 which is threadedly mounted in a flat fitting 77 secured to the side wall of frame 12. The end portion 78 of the stem 79 of adjusting screw 76 has a reduced diameter and extends through an apertured lug 81 on the inner end of mirror carrier 72. The lug is retained seated between an annular shoulder 82 on stem 79 and a coil spring 83 which surrounds the reduced diameter portion 78. Thus, rotation of the adjusting screw 76 results in lateral movement of the lug 81 which pivots the mirror carrier 72 about pin 73. The flat fitting 77 and the head of adjusting screw 76 are provided with a coacting scale and indicator (not shown) in order that the adjustment of the screw 76 may be accurately measured.

The mirror system 71 is divided into a pair of mirror components 80 and 90. Mirror component 80 consists of a single mirror 85 to reflect a reversed image. Mirror component 90 consists of a pair of mirrors 86 and 87 to reflect a normal image. It will be understood that mirror component 80 may comprise any odd number of mirrors and mirror component 90 may comprise any even number of mirrors. For convenience, a separate single mirror 84 is positioned on the carrier 72 to direct the images reflected by the components 80 and 90 upwardly through a window 70 in the top wall of frame 12 for convenient viewing. It will be understood that the mirror 84 may be eliminated if the components 80 and 90 are so positioned that the reflected images emerging therefrom may be conveniently viewed directly. Mirrors 85 and 86 are the objective mirrors of the components 80 and 90, respectively, and face horizontally outwardly through a pair of windows 88 and 89 on the side of frame 12 for exposure to a target 91 positioned a substantial distance laterally from the tool 1. The portions of the mirrors 85 and 86 which are exposed to the target for initial reflection thereof will hereinafter be referred to as objective reflecting portions.

Preferably, a pair of tools 1 are provided for cooperative use in the testing of both headlamps of a vehicle in a single operation. Each of the tools 1 comprising the pair is provided with an elongated vertical target 91 which may be a painted strip exposed to the mirror system of the other tool. When one of the tools is mounted on one headlamp of a vehicle and the other tool is mounted on the other headlamp of the vehicle, the mirror system and target of each tool faces inwardly toward the mirror system and target of the other tool. In other respects, the pair of tools are identical.

The mirror system 71 is a slightly modified embodiment of the mirror system 71a which is illustrated in FIGURE 5. For convenience and a better understanding of each of the systems 71 and 71a, the latter will be first described in detail. The mirror system 71a is divided into a pair of mirror components 80a and 90a. Mirror component 80a comprises a single mirror 85a to reflect a reversed image. Mirror component 90a comprises a pair of mirrors 86a and 87a to reflect a normal image. It will be understood that mirror component 80a may comprise any properly arranged odd number of mirrors and mirror component 90a may comprise any properly arranged even number of mirrors.

The positions of mirror components 80a and 90a are fixed with respect to a pair of imaginary datum planes 92a and 93a which intersect at a predetermined angle of preferably 90° as shown in FIGURE 5. The plane 92a, hereinafter referred to as the objective datum plane, is a reference plane along which it is desired that the line of sight of the mirror system 71a be extended. Preferably, the plane 92a is vertical and intersects the longitudinal axis of the headlamp aiming tool near the outer end thereof. The plane 93a, hereinafter referred to as the reflection datum plane, is a reference plane preferably vertical and coincident with the longitudinal axis of the tool, along which plane it is desired that rays of light be reflected by the mirror system 71a, which rays are received from an object lying in objective datum plane 92a. Each of the mirror components is so positioned with respect to the datum planes 92a and 93a as to receive light rays from an object lying in objective datum plane 92a and reflect such rays along reflection datum plane 93a. When the angle between the datum planes 92a and 93a is 90°, the single mirror 85a of mirror component 80 is positioned in a vertical plane with its reflecting face passing through the intersection of such datum planes at an angle of 45° from each to reflect along datum plane 93a rays received from target 91a lying in datum plane 92a. The objective mirror 86a of mirror component 90a is positioned in a vertical plane with its reflecting face intersecting the datum plane 92a at a point spaced a short distance from the intersection of the planes 92a and 93a. The angle of incidence between the mirror 86a and the objective datum plane 92a is established for convenience at 67½° to reflect toward plane 93a light rays received along plane 92a. These are again reflected by the mirror 87a along plane 93a. Thus, the mirror 87a is positioned in a vertical plane at an angle of 67½° with respect to plane 93a with the reflecting face of mirror 87a passing through the intersection of the plane 93a and the rays reflected by mirror 86a from the target in plane 92a. Of course, the angle between the mirror 86a and plane 92a may be varied between wide limits so long as the mirror 86a is positioned to reflect toward plane 93a rays received along plane 92a. However, the position of mirror 87a must be changed accordingly to again reflect such rays along plane 93a.

Figure 6:
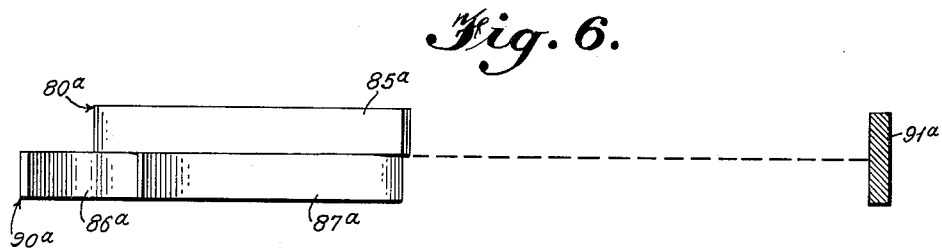
FIGURE 6 is a horizontal view of the mirror system of FIGURE 5.
Figure 7:
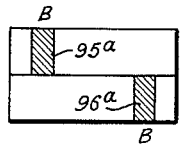
FIGURE 7 illustrates the emergent reflected images of the target when the objective datum plane of the mirror system does not intersect the target.
Figure 8:
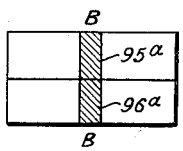
FIGURE 8 illustrates the emergent reflected images of the target when the objective datum plane does intersect the target.

With reference to FIGURES 6-8, the mirror components 80a and 90a are displaced vertically so that the upper half of an elongated vertical target 91a will be reflected as a reversed image 95a by the component 80a and the lower half of the target will be reflected as a normal image 96a by the component 90a. When the objective datum plane 92a intersects the target 91a, the images 95a and 96a will be vertically aligned and lie in reflection datum plane 93a as shown in FIGURES 5 and 8. However, if the target 91a is positioned on one side or the other of the objective datum plane 92a, the single mirror component 80a will reflect a reversed image of the target on one side of the plane 93a and the double mirror component 90a will reflect a normal image of the target on the opposite side of the plane 93a as shown in FIGURES 5 and 7. The entire mirror system may then be rotated about a vertical axis until the images 95a and 96a are vertically aligned which indicates that the target is intersected by the objective datum plane 92a.

The mirror system 71 shown in FIGURES 1 and 3 is identical to the mirror system 71a shown in FIGURE 5 except that the objective mirrors 85 and 86 are horizontally displaced a small amount on opposite sides of datum plane 92. The mirrors 85 and 86 thus have spaced objective reflecting portions, respectively, facing horizontally outwardly through a pair of spaced windows 88 and 89 in the side wall of frame 12. An elongated vertical target 91 which may be a painted strip is positioned on the exterior surface of the frame 12 between the windows 88 and 89.

The horizontal spacing of the objective reflecting portions of the mirrors 85 and 86 is especially advantageous because such spacing permits the elongated vertical target 91 to be positioned between such objective reflecting portions without obstructing their field of view while, at the same time, being conveniently positioned to be in the line of sight of the mirror system of a similar tool mounted on the opposite headlamp.

In general, the mirror components 80 and 90 are positioned with respect to the objective and reflection datum planes 92 and 93 in substantially the same angular relationship as the mirror components 80a and 90a bear to the datum planes 92a and 93a. However, such angular relationship of the mirror components and datum planes must be slightly adjusted because the separation of the objective reflecting portions of the mirrors 85 and 87 results in a variance of the angle of incidence with the objective mirrors of rays from targets on the plane 92 spaced at different distances from the mirror system. As shown in FIGURE 3, the mirror components 80 and 90 must be so positioned with respect to the datum planes 92 and 93 as to reflect along plane 93 rays received from a target which is not only coincident with the plane 92 but spaced from the mirror system 71 a distance substantially equal to the distance between the vehicle headlamps to be tested. This requires the ends of the objective mirrors 85 and 86 nearest the target to be rotated slightly inwardly toward the plane 92 to aim the mirrors at a common point on plane 92 spaced from the mirror system a distance substantially equal to the distance between the vehicle headlamps. It has been found that the slight horizontal spacing of the objective mirrors 85 and 87 does not materially effect the accuracy of the mirror system 71 in testing the alignment of the headlamps of various vehicles even though the spacing between such headlamps may be slightly varied.

In operation of the apparatus shown in FIGURES 1-4, the vehicle to be tested is placed on a generally horizontal surface. A pair of aiming tools 1 are mounted with one aiming tool on each headlamp. Each tool is mounted on its associated headlamp by placing the seating surfaces 22 of the adapters 16 in contact with their corresponding reference surfaces 7. The operator presses inwardly on the handle 49 which compresses the springs 55 and 56 and presses the vacuum cup 44 against the lens 4. Due to the collapse of the bellows 54, the air therein is forced outwardly through the passages 62 and 61 to escape between the vacuum cup 44 and the lens 4. When the handle 49 is released, the spring 55 expands the bellows and reduces the pressure therein to impart a positive suction through the passages 62 and 61 to the interior of the vacuum cup, thereby causing it to firmly adhere to the lens. The spring 56, acting against the cross member 42, urges the tool toward the lens to firmly seat the seating surfaces 22 against the reference surfaces 7. The bellows 54 provides a suction pump which causes the vacuum cup 44 to adhere to the lens much more firmly than would a conventional vacuum cup without such a pump. Further, even if slight leakage between the vacuum cup and the lens occurs, the action of the bellows 54 maintains sufficient suction to retain the vacuum cup in adhering relationship to the lens for an appreciable period of time. A spirit level mechanism (not shown), which is provided with a leveling screw having a scale corresponding to the scales on the adjusting screws 41, is placed on the floor on which the vehicle to be tested rests with the longitudinal axis of the level mechanism parallel to the longitudinal axis of the vehicle. This leveling screw is adjusted until the level bubble in the spirit level mechanism is centered to determine the slope of the floor. One of the adjusting screws 41 is then adjusted to obtain a reading on its scale which corresponds to the reading on the scale of the spirit level mechanism on the floor. The other adjusting screw 41 is adjusted to center the bubble of the spirit level assembly 31. The reading of the scale on the latter adjusting screw indicates the vertical angular relationship of the longitudinal axis of the headlamp on which the tool is mounted with the floor on which the vehicle rests. If this vertical angular relationship is not within a specified range, the necessary vertical angular adjustment of the headlamp may be effected.

The horizontal alignment of each headlamp is checked by observing the image of the target 91 on the tool on the other headlamp as reflected by the mirror system 71. If the image reflected by the mirror component 80 is not vertically aligned with the image reflected by the mirror component 90, the mirror system 71 may be rotated about the pin 73 by rotation of the adjusting screw 76 to bring the reflected images into vertical alignment. The reading on the scale on the adjusting screw 76 then indicates the horizontal angular relationship between the longitudinal axis of the headlamp on which the tool is mounted and the longitudinal axis of the vehicle. If this horizontal angular relationship is not within a specified range, the necessary horizontal angular adjustment of the headlamp may be effected.

It is apparent that the alignment of the opposite headlamp may be tested in the same manner as that of the first headlamp without removing the pair of aiming tools.

A modified embodiment of the invention is shown in FIGURES 9 through 11, inclusive. This embodiment differs from that shown in FIGURE 1 primarily by virtue of a modified vacuum cup means for attaching the tool to a head-lamp lens. With reference to FIGURES 9 and 10, a headlamp aiming tool 101 includes a frame 102 having a cross member 103 on which a vacuum cup 104 is mounted so as to be longitudinally immovable with respect to the cross member 103. The cross member 103 may flex slightly but the vacuum cup is substantially immovable longitudinally of the frame. A metal base member 105 is secured to the cross member 103 by a screw 106. The base member 105 is bored to receive a longitudinal tube 107 and a lateral tube 108. The base 109 of the vacuum cup 104 is secured to the tube 107 and a conduit 111 extends longitudinally through the vacuum cup to connect the tube 107 with the vacuum cup face. The outer end of the tube 108 is connected to a valve body 113 by a flexible tube 112. Slideably mounted in valve body 113 is a sleeve valve 114 which is actuated by an operating handle 115. When the operating handle 115 is pressed inwardly a lateral bore 116 in the sleeve valve 114 is aligned with a lateral tube 117 which is connected by a flexible tube 118 to a fitting 119 which extends through the wall of frame 102 for connection to any suitable suction pump (not shown). When the pump is connected to the fitting 119 and the handle 115 is depressed to open the valve 114, suction is applied to the vacuum cup 104. As long as such suction is applied, a low pressure exists in the valve body 113 and the sleeve valve 114 is retained in the depressed position by atmospheric pressure. However, when the suction pump is turned off, the sleeve valve is forced outwardly by the action of spring 122. The suction pump may also be disconnected from the vacuum cup 104 by manually pulling outwardly on the operating handle 115 to close the inner end of tube 117 and to align the lateral bore 116 with a vent to atmosphere (not shown) in the housing 113.

The tool 101 is provided with a spirit level device 123 which is attached to the frame 102 by screws 124 with the axis of the spirit level parallel to the axis of the tool 101. The level bubble may be viewed through a window 125 in the frame 102. It will be understood that a spirit level assembly 31 as shown in FIGURE 1 may be substituted for the spirit level 123 in the tool 101. A second spirit level normal to the longitudinal axis of the tool 101 is shown at 126 attached to the frame by screws 127 and viewable through window 128.

The mirror system 131 of the tool 101 is identical in all respects with the mirror system 71 in FIGURE 1 except that it is mounted on a table 132 which is non-rotatably mounted on the frame 102. It will be understood that the pivotable table 72 and associated indexed adjusting mechanism shown in FIGURE 3 may be used if desired.

A modified form of suction mechanism for use with the tool 101 is shown in FIGURE 13. In this embodiment, a cylinder 141 is rigidly mounted on the cross member 103 and the vacuum cup 104 is fixed to a tubular extension 142 integral with cylinder 141. A longitudinal bore 143 in tubular extension 142 connects the interior of the cylinder with the conduit 111 in the vacuum cup 104. A piston 144 is slideably mounted in the bore 145 of cylinder 141 and is operated by a piston rod 146 which is connected to an operating handle 147 which in turn extends laterally through an opening 148 in the frame 102. The piston 144 is normally urged toward the vacuum cup 104 by a coil spring 149. When the vacuum cup 104 is attached to the lens 4, the operating handle 147 is pulled outwardly and is engaged by a retaining latch 151. The action of the piston 144 in cylinder 141 reduces the pressure between the face of the vacuum cup 104 and the lens 4 to cause firm adherence of the vacuum cup to the lens. The handle 47 exerts a pulling force on the frame 102 and, by flexing the cross member 103, urges the frame toward the headlamp more firmly to seat the apparatus.

In the embodiments of FIGURES 10 and 13, the vacuum cup is substantially immovably mounted on the frame and is so positioned that the face of the vacuum cup engages the headlamp lens 4 when the seating surfaces 22 of the adapters 16 contact the reference surfaces 7 of the lens 4. Preferably, the concave face of the vacuum cup 104 is relatively deep and has a radius less than the radius of the lens face. Thus, the peripheral portion of the vacuum cup face engages the lens while the central portion of such face is spaced therefrom. When suction is applied between the vacuum cup and the lens, the central portion of the vacuum cup face will be pulled toward the lens which urges the frame into close seating engagement with the headlamp. Thus, the necessity of a mechanical spring to urge the frame into seating engagement with the lens is eliminated. The concave face of the vacuum cup 104 is sufficiently deep and its radius is sufficiently small with respect to each lens with which is is used so that firm adherence of the tool to the headlamp is obtained whether the tool is mounted on a small lens with the adapters retracted or on a larger lens with the adapters extended.

As in the case of the device of FIGURE 1, a pair of tools 101 as shown in FIGURES 10 and 13 are provided for cooperative use in the testing of both headlamps of a vehicle in a single operation. The tools comprising the pair are identical except that, when one of the tools is mounted on one headlamp of the vehicle and the other tool is mounted on the other headlamp of the vehicle, the mirror system and target of each tool faces inwardly toward the mirror system and target of the other tool.

The operation of the devices as shown in FIGURES 10 and 13 is generally similar to that of the device of FIGURE 1. One difference resides in the manner of attachment of the tool to the headlamp. When the tool 101 is mounted on its associated headlamp by placing the seating surfaces of the adapters in contact with their corresponding headlamp reference surfaces, suction is applied to the vacuum cup by the suction pump (not shown) in the device of FIGURE 10 or the manually operated piston 144 and cylinder 141 of FIGURE 13 to firmly attach the tool to the headlamp. Further, since the mirror system 131 is rigidly mounted with respect to the frame 102, no direct reading is obtained of the exact amount of horizontal angular variation of the longitudinal axis of the headlamp from the longitudinal axis of the vehicle. If observation of the reflected images reveals that the longitudinal axis of the headlamp requires horizontal adjustment, such adjustment may be made either while the tool is attached to the lens or by detaching the tool, making a trial adjustment, reattaching the tool for another reading and making further adjustment if necessary. In other respects, the structure and operation of the devices shown in FIGURES 10 and 13 are like those of the device of FIGURE 1.

A further and preferred embodiment of the invention is depicted in FIGURES 14 through 26 inclusive. Shown in perspective in FIGURE 14 is a headlamp aiming tool 151 which includes a frame comprising an outer frame 152 and an inner frame 153 (FIGURE 15). The inner frame 153 is telescopically received and retained in the outer frame 152 by a pair of pins 154 which protrude from the rear of the frame 152 into a pair of grommets 155 mounted in suitable openings in the rear wall of inner frame 153 and by a pair of pins 156 which are provided with knurled knobs outside of the outer frame 152 and extend through openings in the top of the frame 152 into corresponding openings in the inner frame 153. Each of the pins 156 is held in place by a frictional fit in the frame 153 and may be removed by pulling outwardly on the knurled knob. When the pins 156 are removed, the entire inner frame 153 may be slid axially outwardly from the outer frame 152. The pins 156 are also rotatable in bearings 160 (FIGURE 23) depending from the frame 153 for a purpose to be described hereinafter. The bearings 160 preferably are formed of an organic polymeric plastic material.

The inner frame 153 includes a cup-shaped end member 157 which is provided with an annular seating surface 176 corresponding to the reference surface provided by aiming pads 6 on the lens 4 to enable the tool 151 to be properly positioned relative to the headlamp 2. To decrease the shock to the operating components attached to the inner frame 153 in case the tool is dropped, the end member 157 is connected to the main body of the frame 153 by a shock absorbing connection comprising three rivets 177 which extend through the base of the cup-shaped member 157 and a flange 178 of the frame 153. Coil springs 179 are positioned between the flange 178 and the end of each rivet 177 thereby enabling the end member 157 to be moved resiliently away from the frame 153 in the event of a sudden impact.

Figure 17:
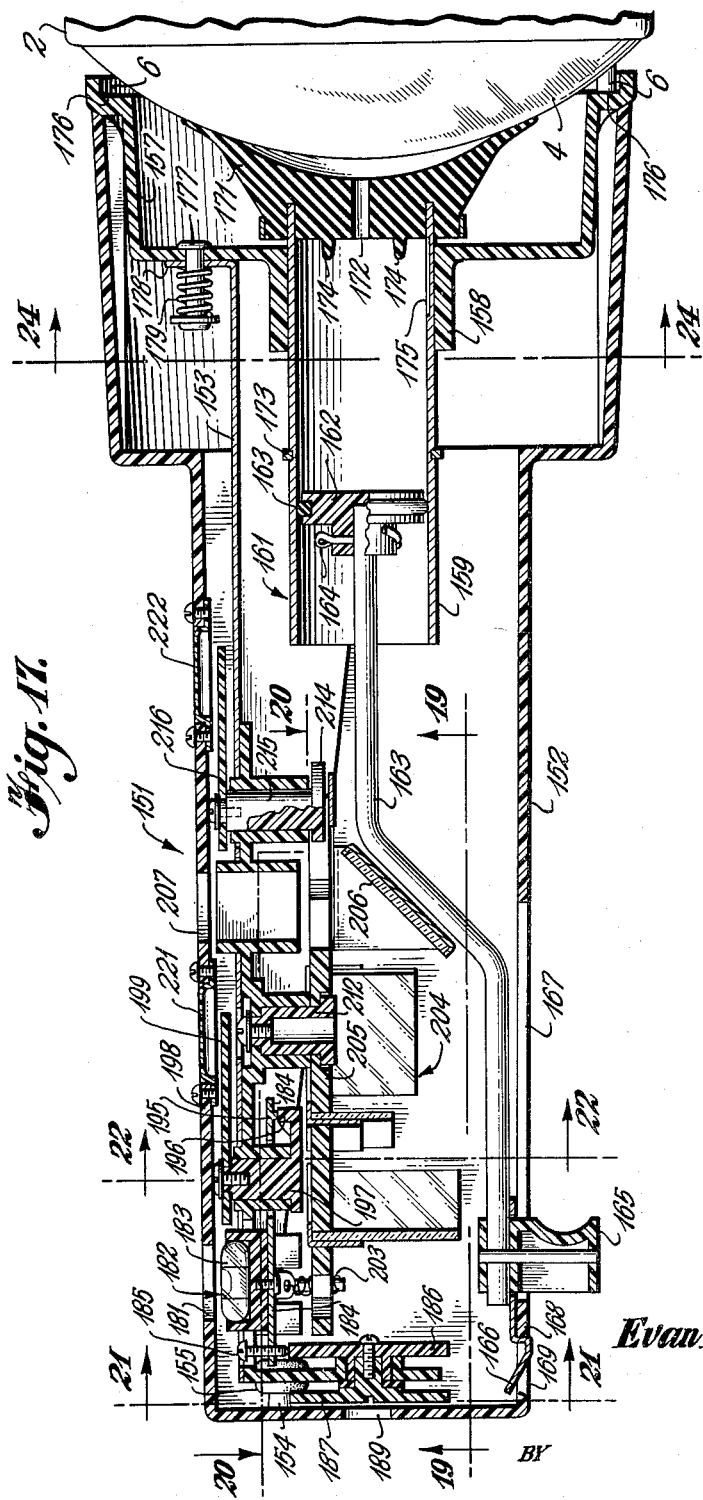
FIGURE 17 is another vertical sectional view taken along the line 17—17 of FIGURE 15.
Figure 24:
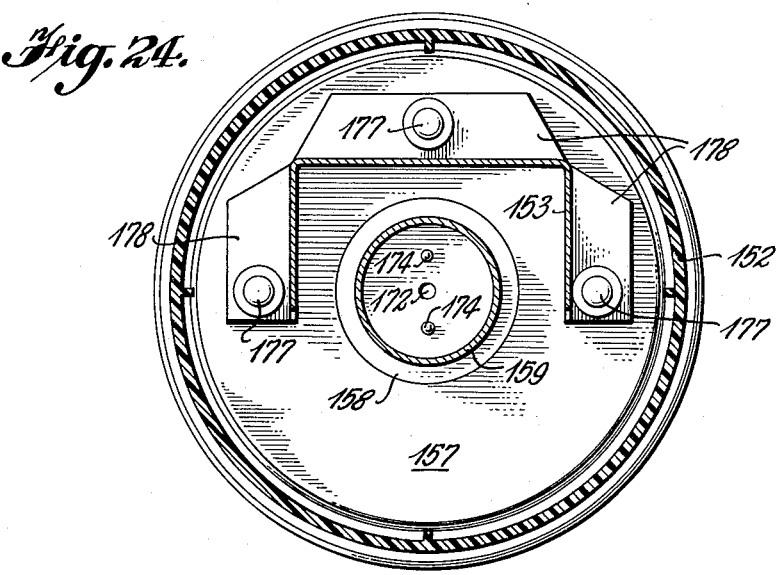
FIGURE 24 is a transverse vertical section taken along the line 24—24 of FIGURE 17 and showing shock absorbing frame connections.

The end member 157 is also provided with a bored axial boss 158 to slidingly receive a cylinder 159 of an expansible chamber actuating device 161 (FIGURE 17) which also includes a piston 162 and a piston rod 163. The piston 162 is telescopically received in the cylinder 159 and is provided at its outer periphery with a sealing ring 163. The piston rod 163 is retained axially within the piston 162 by a cotter pin 164. Securely pinned to the piston rod 163 near its outer end is a handle 165. The handle 165 protrudes through and is reciprocable in an elongated slot 167 in the outer frame 152. By means of the handle, an operator may reciprocate the piston rod 163 and piston 162 to expand and contract the expansible chamber of the actuating device 161. The piston rod 163 is Z-shaped, as best seen in FIGURE 17, to permit it to reciprocate without interfering with the other internal structure of the apparatus. Attached to the extreme outer end of the piston rod 163, is a resilient detent 166. When the handle 165 is near the extreme outer end of its path of movement, the detent 166 is cammed inwardly by a short bridge 168 in the frame 152 and drops by its own resilience into a slot 169 to removably lock the piston rod 163 and piston 162 at the outer end of their path of travel by the mutual engagement of corresponding shoulders of the detent 166 and bridge 168.

A vacuum cup 171 is fixed to the outer end of cylinder 159 which is slideable in the boss 158 to enable the vacuum cup 171 to be moved outwardly for easy attachment to the lens 4 of headlamp 2. The outward movement of the cylinder 159 is limited by the engagement with the end of the boss 158 of a snap ring 173 which fits into a corresponding slot in the cylinder 159 and functions as a stop. The vacuum cup 171 is provided with an axial conduit 172 which connects the inside of the cylinder 159 with the face of the vacuum cup 171. A pair of resilient protrusions 174 on the back of the vacuum cup 171 engage the piston 162 when it nears the inner end of its travel toward the vacuum cup. As shown in FIGURE 17, the inner wall of the cylinder 159 is slotted at 175 to provide a bypass for the passage of fluid around the piston 162 near the end of its stroke toward the vacuum cup 171.

When mounting the tool 151 on the headlamp 2, the seating surface 176 is seated against the aiming pads 6. By moving handle 165 inwardly, the piston 162 engages the protrusions 174 and the cylinder 159 together with the vacuum cup 171 is moved outwardly from the tool until the vacuum cup firmly engages the surface of the lens. Then the handle 165 is pulled outwardly to move the piston 162 relative to the cylinder 159 so as to expand the chamber of the actuating device 161 thereby applying suction to the vacuum cup 171 to increase its grip against the lens 4. The outward movement of handle 165 is continued until the detent 166 drops into the slot 169 and is retained by the bridge 168. Because of the reduced pressure within the expansible chamber device 161 and the engagement of the detent 166 with the frame 152, the entire frame is urged toward the headlamp thereby firmly seating the seating surface 176 against the reference surface of the aiming pads 6.

To remove the tool from the headlamp, the detent 166 is pressed inwardly and released thereby permitting inward movement of the handle 165. As the piston 162 moves inwardly, the suction of the vacuum cup is reduced until the piston is moved across the bypass 175 at which time the vacuum cup is vented, thereby releasing its grip and permitting removal of the tool.

An important advantage is gained by the manner in which the expansible chamber device 161 is connected to the headlamp aiming tool so as to perform the two functions of increasing the suction of the vacuum cup 171 and urging the frame into close engagement with the headlamp. This construction insures firm mounting of the tool on the headlamp lens and eliminates the necessity for such expedients as mechanical springs to urge the tool against the headlamp.

Viewable through a window 181 (FIGURE 14) in the top of the tool 151 is a spirit-level device 182 (FIGURE 17) which includes a level bubble vial 183 supported by a floating mount 184, the outer end of which is provided with an adjusting screw 185 which engages and follows a cam 186 rotatably mounted inside the rear wall of the frame 153. Mounted on the outside of the rear wall of the frame 153 is an adjusting wheel 187 which is turnable by a slot 188 (FIGURE 21) which may receive the head of a screw driver inserted through an opening 189 (FIGURE 14) in the rear wall of the frame 152. A pair of calibrated scales 192 and 193 (FIGURE 21) are placed on the rear face of the adjusting wheel 187. These scales are viewable through a window 194 (FIGURE 14) in the rear wall of the frame 152. By means of the adjusting wheel 187, an initial setting may be placed into the spirit-level mechanism corresponding to the slope of the floor on which the vehicle to be tested is placed. The slope of the floor is determined by a suitable level device (not shown) having indicia calibrated to correspond to the scales 192 and 193. If the floor is level, both scales 192 and 193 will be set at zero. If the floor slopes in one direction, an appropriate setting is made on the scale 192; if the floor slopes in the other direction, an appropriate setting is made on the scale 193. Thus the level vial 183 is preset at a level or other standard position regardless of the slope of the floor.

The end of the floating mount 184 opposite to the adjusting screw 185 is provided with a protruding cam follower 195 (FIGURE 17) which rests on the surface of a rotary cam 196 which is fixed to a vertical post 197 which in turn is rotatably mounted in the top of the frame 153. At the top of the post 197 is mounted an arcuate adjusting wheel 198 having a pointer 199 attached thereto (FIGURE 15). As shown in FIGURE 23, the adjusting wheel 198 is operated by a friction roller 201 which is mounted on the stem of one of the pins 156. By rotation of the pin 156, the wheel 198 is correspondingly rotated to move the cam 196 thereby raising or lowering the end of the floating mount 184. The pointer 199 coacts with an arcuate scale 202 (FIGURE 15) positioned on the top of the frame 153 and viewable through a window 221 in the top of frame 152. Thus when the scales 192 and 193, of the adjusting wheel 187 (FIGURE 21), are properly preset according to the slope of the floor on which the vehicle is resting, the position of the pointer on the scale 202 indicates whether or not vertical adjustment of the headlamp is required.

The floating mount 184 is biased downwardly into engagement with the cams 186 and 196 by a tension spring 203 (FIGURES 17 and 20) which is connected between the mount 184 and the frame 153. As best seen in FIGURE 20, the mount 184 is provided with a suitable opening to permit movement up and down around the post 197 and its bearing.

The tool 151 is provided with a mirror system 204 comprising a plurality of mirrors arranged in a manner identical to the mirrors of the mirror system 71 of the tool shown in FIGURE 1 and for the same purpose. Like the mirror system 71, the mirror system 204 is mounted on a table 205 which is rotatable about a vertical axis but unlike the system 71, the mirror system 204 is mounted on the bottom of its supporting table. The images from the components of the mirror system 204 are reflected upwardly by an inclined mirror 206 (FIGURE 17) through openings in the table 205 and the frame 153 to be viewed through window 207 in the top of the frame 152. The side of the frame 152 is provided with a pair of spaced windows 208 and 209 (FIGURE 14), between which is positioned a target 211. When a tool 151 is mounted on each headlamp of a vehicle, the objective reflecting portions of the components of mirror system 204 of one tool are exposed to the target 211 of the other tool.

The mirror carrying table 205 is rotatably mounted on a post 212 which depends downwardly from the frame 153. The inner end of the table 205 is bifurcated (FIGURE 20) and is provided with an inwardly extending adjusting screw 213 which is adapted to engage and follow a rotary cam 214 which is fixed to a post 215 rotatably journalled in the top of the frame 153. The table 205 is biased by a tension spring 219 to urge the pin 213 into engagement with the cam 214. To the upper end of the rotatable post 215 is fixed an arcuate adjusting wheel 216 identical to the wheel 198. The wheel 216 is provided with a pointer 217 (FIGURE 15) which coacts with a scale 218 positioned on the upper face of the frame 153 and viewable through a window 221 in the top of frame 152. The scale 218 is employed in the same manner as the scale on the adjusting screw 76 (FIGURE 3) to indicate the horizontal angular relationship between the longitudinal axis of the headlamp on which the tool is mounted and the longitudinal axis of the vehicle. The adjusting wheel 216 is operated in the same manner as the wheel 198 by one of the rotatable pins 156 and a friction drive roller 201 as shown in FIGURE 23.

The purpose and manner of operation of the mirror system 204 and its adjusting mechanism is the same as those of the mirror system 71 and its adjusting mechanism shown in FIGURES 1 and 3 and described hereinbefore.

Figure 25:
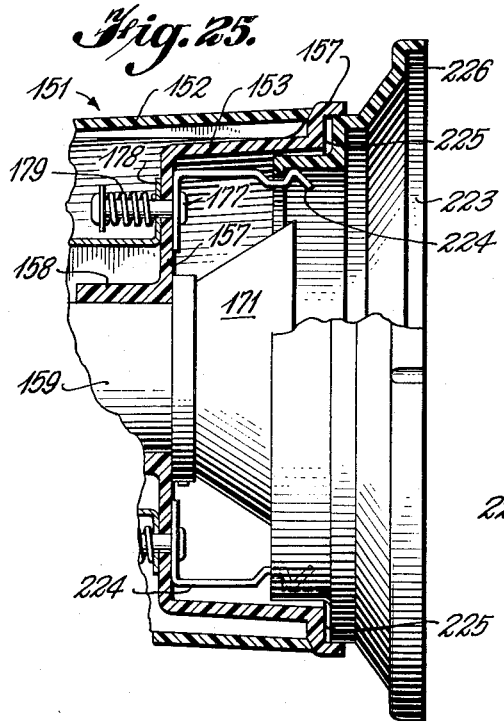
FIGURE 25 is a fragmentary horizontal section showing the front end of the preferred embodiment with an adapter attached thereto.
Figure 26:
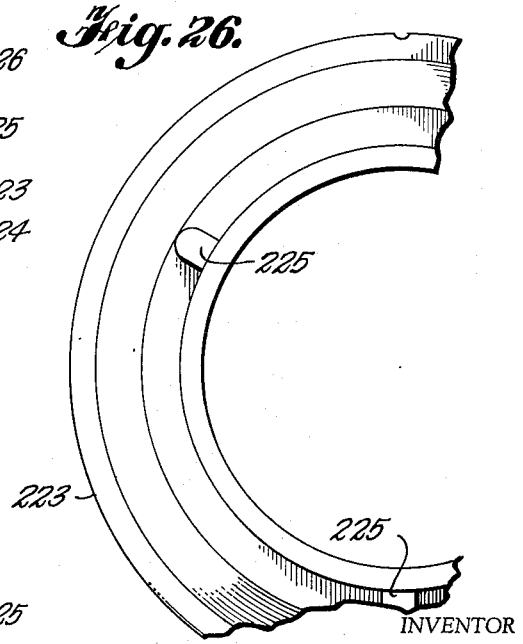
FIGURE 26 is a fragmentary end view of the adapter of FIGURE 25.

With reference to FIGURES 25 and 26, an adapter 223 may be employed with the tool 151 to attach the tool to a larger sized headlamp. The adapter is locked in position against the end member 157 by a plurality of spring fingers 224 which are connected to the rivets 177 in the member 157. The rear face of the adapter is provided with a plurality of protruding surfaces 225 which are seated against the seating surface 176 of the end member 157. The adapter is also provided with an outwardly facing annular seating surface 226 which engages the aiming pads 6 when the tool 151 is mounted on a headlamp with the adapter attached.

Except as otherwise stated, the aiming tool 151 is operated in the same manner as the aiming tool 1 shown in FIGURE 1.

While the invention has been described with respect to certain specific embodiments, it will be understood that various changes may be made by persons skilled in the art without departing from the scope of the invention as defined by the appended claims.

This application is a continuation-in-part of my co-pending application Serial No. 667,191, filed June 21, 1957, now abandoned.

I claim:

1. Apparatus for testing the adjustment of one of a pair of vehicle headlamps having outwardly facing reference surfaces for positioning such apparatus comprising a frame having a seating surface corresponding to the reference surface of its associated headlamp, means carried by said frame for releasably retaining said frame on said headlamp with said seating surface seated on said reference surface, means carried by said frame for indicating when the axis of said headlamp is inclined a predetermined amount from the horizontal, means adapted for attachment to the other headlamp providing a target positioned a predetermined distance outwardly from said other headlamp, a multiple mirror optical system movably carried by said frame comprising a pair of mirror components each having an objective reflecting portion exposed to the target when the apparatus is attached to said headlamps, one of said mirror components providing an even number of reflecting surfaces to reflect a normal target image and the other of said mirror components providing an odd number of at least one reflecting surface to reflect a reversed target image, said components being so positioned relative to a pair of imaginary datum planes which intersect at a predetermined angle that the emergent reflection paths of said reversed and normal images both lie in one of said planes only when the other of said planes intersects the target, means for moving said optical system relative to said frame to cause said other datum plane to intersect the target, and means for indicating the position of said optical system relative to said frame.

2. Apparatus as recited in claim 1 wherein said means for releasably retaining said frame on said headlamp comprises a vacuum cup engageable with the lens of its associated headlamp, and conduit means for connecting the inside of said vacuum cup with a suction pump.

3. Apparatus as recited in claim 2 further characterized by a manually operated suction pump mounted on said frame and connected to said conduit means.

4. Apparatus for testing the adjustment of at least one of a pair of vehicle headlamps having outwardly facing reference surfaces for positioning such apparatus comprising a frame having a seating surface corresponding to the reference surface of its associated headlamp, a vacuum cup longitudinally immovably mounted on said frame for engagement with the lens of its associated headlamp, conduit means for connecting the inside of said vacuum cup with a suction pump, said vacuum cup being so positioned relative to said seating surface that said frame is urged toward said headlamp to seat said seating surface on its corresponding reference surface when said vacuum cup engages said lens and sufficient suction is applied to the inside of said vacuum cup, means adapted for attachment to the other headlamp providing a target positioned a predetermined distance outwardly therefrom, and a multiple mirror optical system carried by said frame comprising a pair of mirror components each having an objective reflecting portion exposed to the target when the apparatus is attached to said headlamps, one of said mirror components providing an even number of reflecting surfaces to reflect a normal target image and the other of said mirror components providing an odd number of at least one reflecting surface to reflect a reversed target image, said components being so positioned relative to a pair of imaginary datum planes which intersect at a predetermined angle that the emergent reflection paths of said reversed and normal target images both lie in one of said planes only when the other of said planes intersects the target.

5. Apparatus as recited in claim 4 further characterized by a suction pump mounted on said frame and connected to said conduit means.

6. Apparatus for testing the adjustment of a pair of vehicle headlamps having outwardly facing reference surfaces for positioning such apparatus comprising a pair of devices each having a frame provided with a seating surface corresponding to the reference surface of one of said headlamps, means carried by said frame for releasably retaining said frame on its associated headlamp with said seating surface seated on its corresponding reference surface, means carried by said frame for indicating when the axis of said headlamp is inclined a predetermined amount from the horizontal, means providing a target positioned on said frame a predetermined distance outwardly from said seating surface, and a multiple mirror optical system carried by said frame comprising a pair of mirror components each having an objective reflecting portion exposed to the target on the other device when the apparatus is attached to said headlamps, one of said mirror components providing an even number of reflecting surfaces to reflect a normal target image and the other of said mirror components providing an odd number of at least one reflecting surface to reflect a reversed target image, the mirror components of each device being so positioned relative to a pair of imaginary datum planes which intersect at a predetermined angle that the emergent reflection paths of the reversed and normal target images both lie in one of said planes only when the other of said planes intersects the target on the other device.

7. Apparatus as recited in claim 6 wherein said means for releasably retaining said frame on said headlamp comprises a vacuum cup engageable with the lens of its associated headlamp, and conduit means for connecting the inside of said vacuum cup with a suction pump.

8. Apparatus for testing the adjustment of a pair of vehicle headlamps having outwardly facing reference surfaces for positioning such apparatus comprising a pair of devices each having a frame provided with a seating surface corresponding to the reference surface of one of said headlamps, a vacuum cup longitudinally immovably mounted on said frame for engagement with the lens of its associated headlamp, conduit means for connecting the inside of said vacuum cup with a suction pump, said vacuum cup being so positioned relative to said seating surface that said frame is urged toward said headlamp to seat said seating surface on its corresponding reference surface when said vacuum cup engages said lens and sufficient suction is applied to the inside of said vacuum cup, means providing a target positioned on said frame a predetermined distance outwardly from said seating surface, and a multiple mirror optical system carried by said frame comprising a pair of mirror components each having an objective reflecting portion exposed to the target on the other device when the apparatus is attached to said headlamps, one of said mirror components providing an even number of reflecting surfaces to reflect a normal target image and the other of said mirror components providing an odd number of at least one reflecting surface to reflect a reversed target image, the mirror components of each device being so positioned relative to a pair of imaginary datum planes which intersect at a predetermined angle that the emergent reflection paths of the reversed and normal target images both lie in one of said planes only when the other of said planes intersects the target on the other device.

9. Apparatus as recited in claim 8 further characterized by a suction pump mounted on said frame and connected to said conduit means.

10. Apparatus for testing the adjustment of a pair of vehicle headlamps having outwardly facing reference surfaces for positioning such apparatus comprising a pair of devices each having a frame provided with a seating surface corresponding to the reference surface of one of said headlamps, means carried by said frame for releasably retaining said frame on its associated headlamp with said seating surface seated on its corresponding reference surface, means providing a target positioned on said frame a predetermined distance outwardly from said seating surface, and a multiple mirror optical system carried by said frame comprising a pair of mirror components each having an objective reflecting portion exposed to the target on the other device when the apparatus is attached to said headlamps, one mirror component of each device providing an even number of reflecting surfaces to reflect a normal image of the target on the other device and having its objective reflecting portion positioned on one side of the target of the same device, the other mirror component of each device providing an odd number of at least one reflecting surface to reflect a reversed image of the target on the other device and having its objective reflecting portion positioned on the opposite side of the target of the same device, the mirror components of each device being so positioned relative to a pair of imaginary datum planes which intersect at a predetermined angle that the emergent reflection paths of the reversed and normal target images both lie in one of said planes only when the other of said planes intersects the target on the other device.

11. Apparatus as recited in claim 10 wherein said means for releasably retaining said frame on said headlamp comprises a vacuum cup engageable with the lens of its associated headlamp, and conduit means for connecting the inside of said vacuum cup with a suction pump.

12. Apparatus as recited in claim 11 wherein said vacuum cup is mounted on said frame substantially immovable longitudinally thereof, and is so positioned relative to said seating surface that said frame is urged toward said headlamp to seat said seating surface on its corresponding reference surface when said vacuum cup engages said lens and sufficient suction is applied to the inside of said vacuum cup.

13. Apparatus as recited in claim 11 further characterized by a suction pump mounted on said frame and connected to said conduit means.

14. Apparatus for testing the adjustment of one of a pair of vehicle headlamps having outwardly facing reference surfaces for positioning such apparatus comprising a frame having a seating surface corresponding to the reference surface of its associated headlamp, means carried by said frame for releasably retaining said frame on said headlamp with said seating surface seated on said reference surface, means adapted for attachment to the other headlamp providing a target positioned a predetermined distance outwardly from said other headlamp, a multiple mirror optical system movably carried by said frame comprising a pair of mirror components each having an objective reflecting portion exposed to the target when the apparatus is attached to said headlamps, one of said mirror components providing an even number of reflecting surfaces to reflect a normal target image and the other of said mirror components providing an odd number of at least one reflecting surface to reflect a reversed target image, said components being so positioned relative to a pair of imaginary datum planes which intersect at a predetermined angle that the emergent reflection paths of said reversed and normal images both lie in one of said planes only when the other of said planes intersects the target, means for moving said optical system relative to said frame to cause said other datum plane to intersect the target, and means for indicating the position of said optical system relative to said frame.

15. Apparatus for testing the adjustment of a pair of vehicle headlamps having outwardly facing reference surfaces for positioning such apparatus comprising a pair of devices each having a frame provided with a seating surface corresponding to the reference surface of one of said headlamps, means carried by said frame for releasably retaining said frame on its associated headlamp with said seating surface seated on its corresponding reference surface, means providing a target positioned on said frame a predetermined distance outwardly from said seating surface, a multiple mirror optical system movably carried by said frame comprising a pair of mirror components each having an objective reflecting portion exposed to the target on the other device when the apparatus is attached to said headlamps, one of said mirror components providing an even number of reflecting surfaces to reflect a normal target image and the other of said mirror components providing an odd number of at least one reflecting surface to reflect a reversed target image, the mirror components of each device being so positioned relative to a pair of imaginary datum planes which intersect at a predetermined angle that the emergent reflection paths of the reversed and normal target images both lie in one of said planes only when the other of said planes intersects the target on the other device, means for moving said optical system relative to said frame to cause said other datum plane to intersect the target, and means for indicating the position of said optical system relative to said frame.

16. Apparatus for testing the adjustment of a pair of vehicle headlamps having outwardly facing reference surfaces for positioning such apparatus comprising a pair of devices each having a frame provided with a seating surface corresponding to the reference surface of one of said headlamps, holding means connected to said frame and including a vacuum cup positioned to engage the headlamp in holding relationship, an expansible chamber device mounted between said vacuum cup and said frame to releasably urge said frame toward said headlamp thereby bringing said seating and reference surfaces into pressure engagement, and fluid conducting means connecting said expansible chamber device and said vacuum cup to apply suction to said vacuum cup while said expansible chamber device is urging said frame toward said headlamp; means carried by said frame for indicating when the axis of said headlamp is inclined a predetermined amount from the horizontal, means providing a target positioned on said frame a predetermined distance outwardly from said seating surface, and a multiple mirror optical system carried by said frame comprising a pair of mirror components each having an objective reflecting portion exposed to the target on the other device when the apparatus is attached to said headlamps, one of said mirror components providing an even number of reflecting surfaces to reflect a normal target image and the other of said mirror components providing an odd number of at least one reflecting surface to reflect a reversed target image, the mirror components of each device being so positioned relative to a pair of imaginary datum planes which intersect at a predetermined angle that the emergent reflection paths of the reversed and normal target images both lie in one of said planes only when the other of said planes intersects the target on the other device.

References Cited in the file of this patent

UNITED STATES PATENTS

| | | |
|---|---|---|
| 1,991,928 | Hill | Feb. 19, 1935 |
| 2,398,959 | Petry | Sept. 10, 1943 |
| 2,811,783 | Neely | Nov. 5, 1957 |
| 2,832,602 | Coupe | Apr. 29, 1958 |
| 2,867,910 | Falge | Jan. 13, 1959 |